(12) United States Patent
Yanagimoto (10) Patent No.: US 12,096,164 B2
(45) Date of Patent: Sep. 17, 2024

(54) OPTICAL COMMUNICATION DEVICE, COMPUTER-READABLE STORAGE MEDIUM, SYSTEM, AND OPTICAL COMMUNICATION METHOD

(71) Applicant: SoftBank Corp., Tokyo (JP)

(72) Inventor: Noritomo Yanagimoto, Tokyo (JP)

(73) Assignee: SoftBank Corp., Tokyo (JP)

( * ) Notice: Subject to any disclaimer, the term of this patent is extended or adjusted under 35 U.S.C. 154(b) by 95 days.

(21) Appl. No.: 17/978,967

(22) Filed: Nov. 2, 2022

(65) Prior Publication Data

US 2023/0051214 A1    Feb. 16, 2023

Related U.S. Application Data

(63) Continuation of application No. PCT/JP2021/013069, filed on Mar. 26, 2021.

(30) Foreign Application Priority Data

May 7, 2020    (JP) .................................. 2020-082252

(51) Int. Cl.
*H04B 10/112* (2013.01)
*H04Q 11/00* (2006.01)

(52) U.S. Cl.
CPC ....... *H04Q 11/0003* (2013.01); *H04B 10/112* (2013.01); *H04Q 11/0005* (2013.01)

(58) Field of Classification Search
CPC .......................... H04B 10/112; H04B 10/1123
See application file for complete search history.

(56) References Cited

U.S. PATENT DOCUMENTS 10,225,011 B1    3/2019    Schubert
2008/0044187 A1    2/2008    Krill
(Continued)

FOREIGN PATENT DOCUMENTS

JP    H0856199 A    2/1996
JP    H08149076 A    6/1996
(Continued)

OTHER PUBLICATIONS

International Preliminary Report on Patentability for International Application No. PCT/JP2021/013069, issued by the International Bureau of WIPO on Nov. 8, 2022.
(Continued)

*Primary Examiner* — Nathan M Cors (57) ABSTRACT

To provide an optical communication device including a transmitting optical output unit for transmitting information by optical communication, a receiving optical sensor for receiving information by optical communication, an optical switch that is connected to the transmitting optical output unit and the receiving optical sensor via an optical splitter, a plurality of head parts that are connected to the optical switch, and a control unit for performing control so as to transmit information by emitting a laser from each of the plurality of head parts by switching and guiding a light output by the transmitting optical output unit to the plurality of head parts with the optical switch, and receive information by switching a light received by the plurality of head parts with the optical switch and guiding the light to the receiving optical sensor.

18 Claims, 9 Drawing Sheets

(56) References Cited

U.S. PATENT DOCUMENTS

| | | | |
|---|---|---|---|
| 2009/0202254 A1* | 8/2009 | Majumdar | G01S 17/74 |
| | | | 398/140 |
| 2015/0349881 A1* | 12/2015 | Byers | H04B 10/11 |
| | | | 398/118 |
| 2018/0212681 A1 | 7/2018 | Tanaka | |
| 2018/0267250 A1* | 9/2018 | Hosseini | G01S 7/4818 |
| 2021/0083769 A1* | 3/2021 | Tanaka | H04B 7/1851 |

FOREIGN PATENT DOCUMENTS

| | | | |
|---|---|---|---|
| JP | 2001244892 A | 9/2001 | |
| JP | 2002111590 A | 4/2002 | |
| JP | 2004159032 A | 6/2004 | |
| JP | 2007020100 A | 1/2007 | |
| JP | 2020010219 A | 1/2020 | |
| WO | 2017013864 A1 | 1/2017 | |
| WO | 2019012894 A1 | 1/2019 | |

OTHER PUBLICATIONS

Extended European Search Report for counterpart European Application No. 21800160.0, issued by the European Patent Office on Apr. 29, 2024.

* cited by examiner

FIG.9

OPTICAL COMMUNICATION DEVICE, COMPUTER-READABLE STORAGE MEDIUM, SYSTEM, AND OPTICAL COMMUNICATION METHOD

The contents of the following Japanese patent application(s) are incorporated herein by reference:
NO. 2020-082252 filed in JP on May 7, 2020
NO. PCT/JP2021/013069 filed in WO on Mar. 26, 2021

TECHNICAL FIELD

The present invention relates to an optical communication device, a computer-readable storage medium, a system, and an optical communication method.

BACKGROUND

An optical communication technique for communicating with a communication partner by using a laser light has been known (for example, see Patent document 1).

PRIOR ART DOCUMENT

Patent Document

Patent document 1: Japanese Patent Application Publication No. 2020-010219

DESCRIPTION OF EXEMPLARY EMBODIMENTS

Hereinafter, the present invention will be described through embodiments of the invention, but the following embodiments do not limit the invention according to claims. In addition, not all of the combinations of features described in the embodiments are essential to the solving means of the invention.

Figure 1:
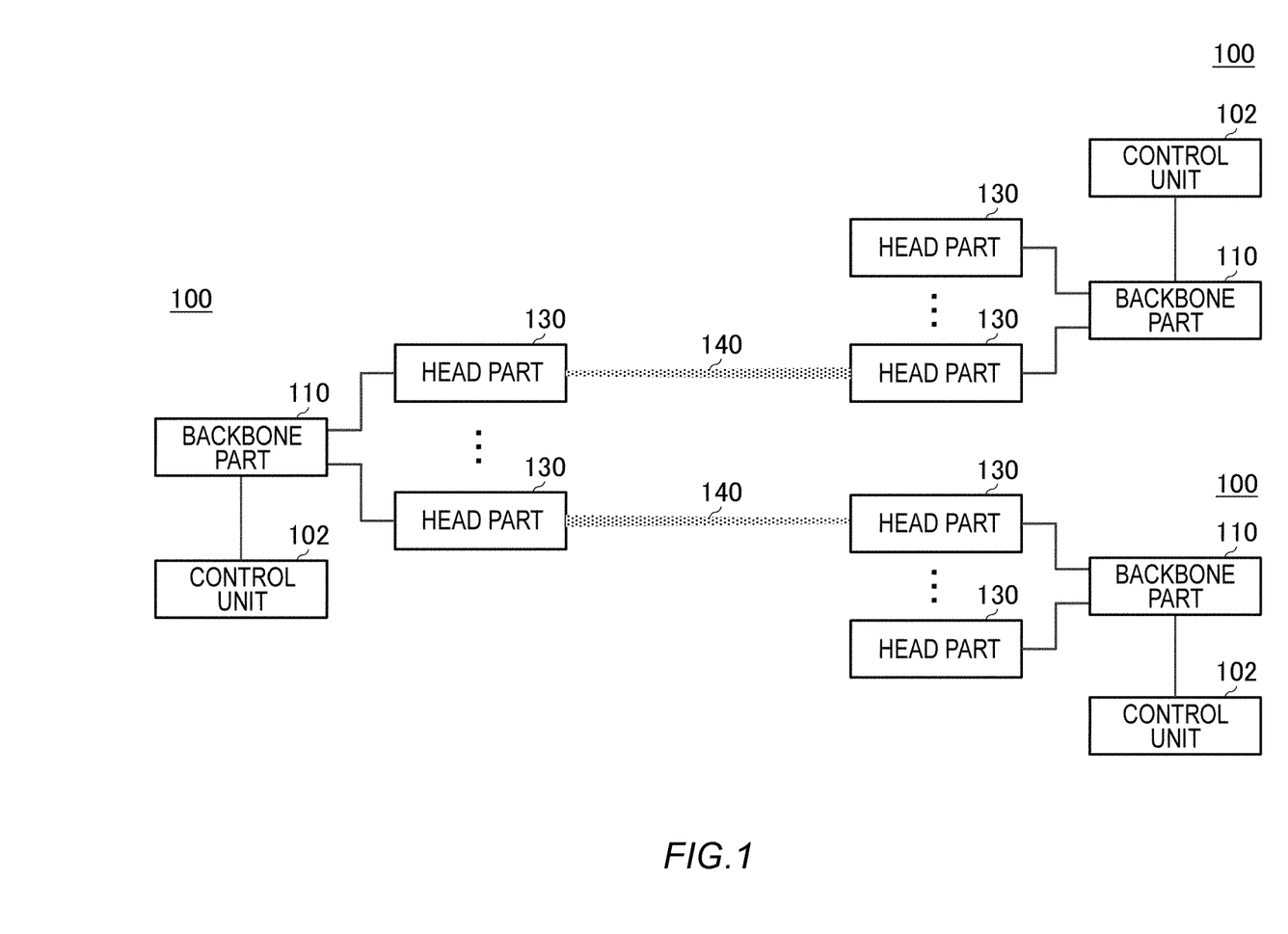
FIG. 1 is a diagram schematically illustrating an example of a functional configuration of an optical communication device 100.

FIG. 1 is a diagram schematically illustrating an example of a functional configuration of an optical communication device 100. The optical communication device 100 includes a control unit 102, a backbone part 110, and a plurality of head parts 130.

The control unit 102 controls the backbone part 110 and the plurality of head parts 130. The control unit 102 and the backbone part 110 may be connected by a metal cable or the like. The backbone part 110 and each of the plurality of head parts 130 may be connected by an optical fiber for communication and a metal cable for control. The control unit 102 may control the plurality of head parts 130 via the backbone part 110. It should be noted that the control unit 102 and each of the plurality of head parts 130 may be directly connected, and the control unit 102 may control the plurality of head parts 130 via that connection.

The backbone part 110 may have a transmitting optical output unit for transmitting information by optical communication, a receiving optical sensor for receiving information by optical communication, and an optical switch that is connected to the transmitting optical output unit and the receiving optical sensor via an optical splitter. The plurality of head parts 130 may be connected to the optical switch. Each of the plurality of head parts 130 may have a lens part and a mirror for direction adjustment that is arranged with respect to the lens part, for adjusting a direction of a light emitted from the lens part and adjusting a direction of a light from the outside with respect to the lens part.

The control unit 102 may perform control so as to transmit information by emitting a laser 140 from each of the plurality of head parts 130 by switching and guiding a light output by the transmitting optical output unit to the plurality of head parts 130 with the optical switch. The control unit 102 may perform control so as to receive information by switching the light received by the plurality of head parts 130 with the optical switch and guiding the light to the receiving optical sensor.

Conventionally, if a plurality of optical wireless transmission/reception units are to be included in an optical communication device, there is a need to include a plurality of sets of an optical output unit, an optical sensor, and a head part. In contrast, the optical communication device 100 according to the present embodiment allows the plurality of head parts 130 to share one transmitting optical output unit and one receiving optical sensor by using a configuration of switching a light to the plurality of head parts 130 and a light from the plurality of head parts 130 with the optical switch. In this manner, the plurality of optical wireless transmission/reception units can be included with one optical output unit and one optical sensor, and it is possible to reduce the entire weight or reduce the cost of the optical wireless device.

Figure 2:
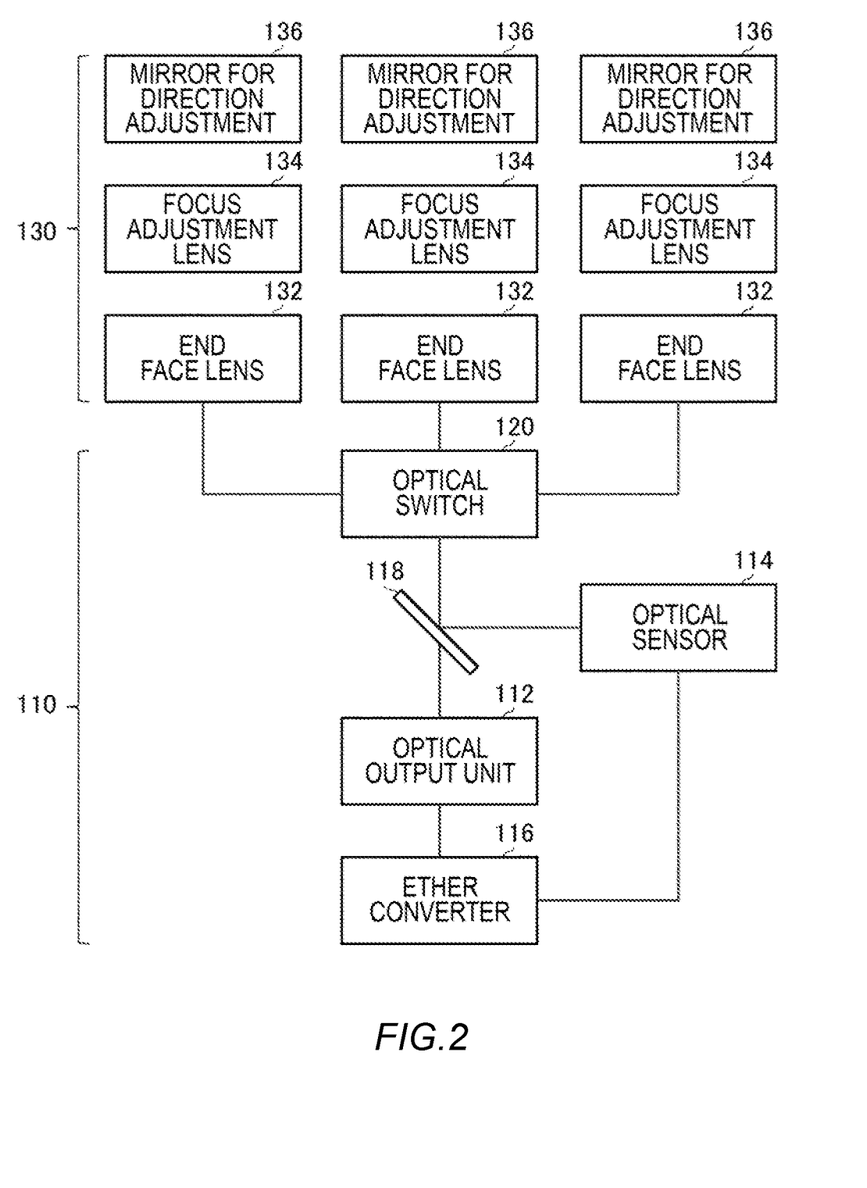
FIG. 2 is a diagram schematically illustrating an example of a configuration of a backbone part 110 and a head part 130.

FIG. 2 is a diagram schematically illustrating an example of a configuration of the backbone part 110 and the head part 130. Although a case in which three head parts 130 are provided is exemplified herein, the number of the head part 130 is not limited thereto, and there may be two head parts 130, or four or more head parts 130.

The backbone part 110 has an optical output unit 112, an optical sensor 114, an Ether converter 116, an optical splitter 118, and an optical switch 120. The optical output unit 112 may be an example of the transmitting optical output unit. The Ether converter 116 converts an electrical signal of information to be transmitted into an optical signal, for example. The optical output unit 112 may output the optical signal converted with the Ether converter 116 to the optical switch 120 via the optical splitter 118. When communicating with a plurality of communication partners, the optical output unit 112 may change the frequency of a light per communication partner.

The control unit 102 may transmit information to each of the plurality of communication partners by, for example, controlling the optical output unit 112, the Ether converter 116, and the optical switch 120, thereby emitting the laser 140 from each of the plurality of head parts 130 by switching and guiding a light output by the optical output unit 112 to the plurality of head parts 130 with the optical switch 120.

The optical sensor 114 may be an example of the receiving optical sensor. The control unit 102 performs control such that a light received by the plurality of head parts 130 is switched with the optical switch 120 and guided to the optical sensor 114. The optical sensor 114 outputs the received optical signal to the Ether converter 116, and the Ether converter 116 converts the received optical signal into information.

The head part 130 has an end face lens 132, a focus adjustment lens 134, and a mirror for direction adjustment 136. The end face lens 132 may be arranged at one end of an optical fiber in which the other end is connected to the optical switch 120. A position of the focus adjustment lens 134 relative to the end face lens 132 is changeable, and the focus adjustment lens 134 adjusts a focus of a light emitted from the end face lens 132 and a light entering the end face lens 132.

The mirror for direction adjustment 136 is arranged with respect to the end face lens 132 and the focus adjustment lens 134, and the mirror for direction adjustment 136 adjusts a direction of a light emitted from the end face lens 132 and the focus adjustment lens 134. In addition, the mirror for direction adjustment 136 adjusts a direction of a light from the outside with respect to the end face lens 132 and the focus adjustment lens 134.

Figure 3:
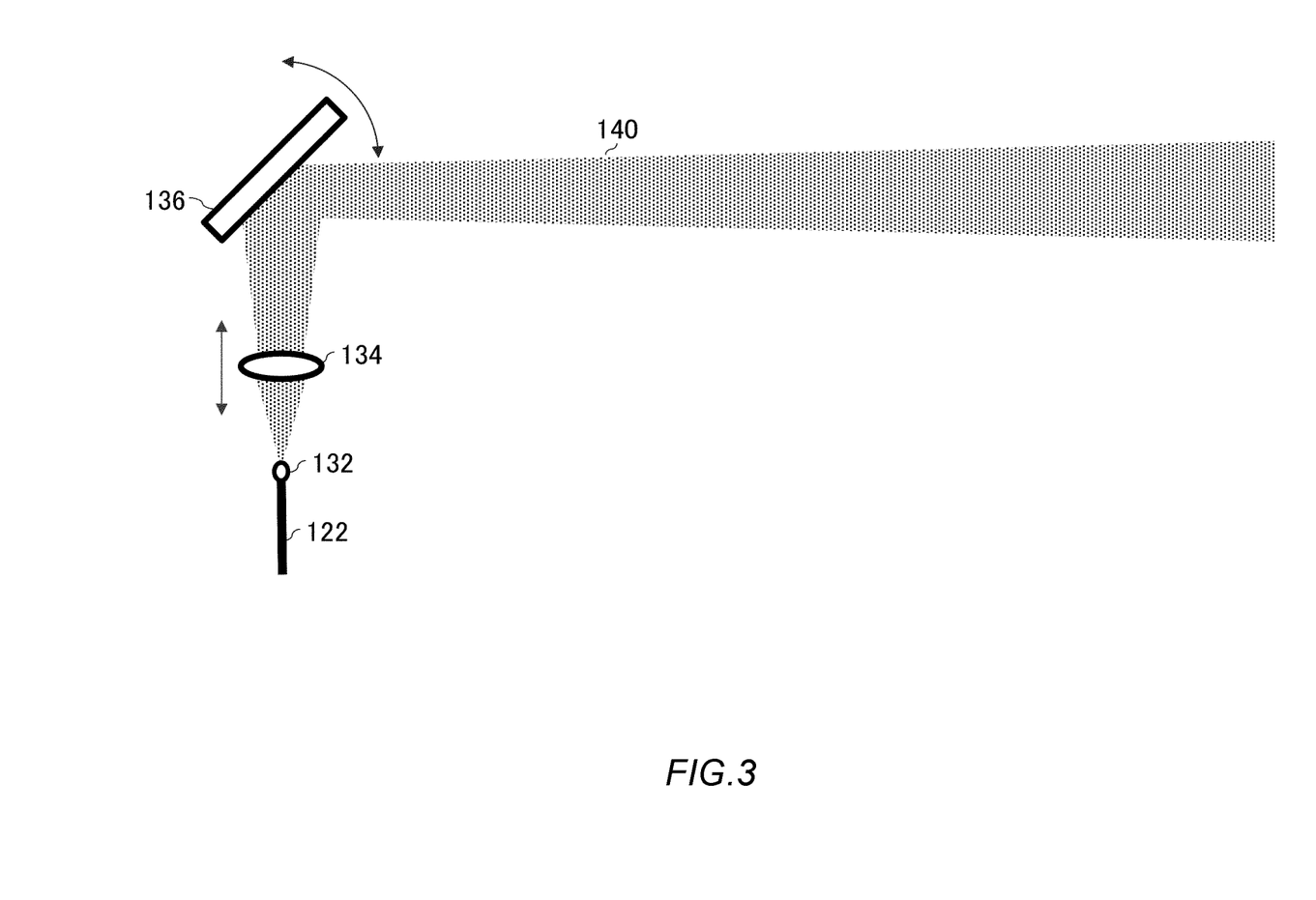
FIG. 3 is an illustration for describing adjustment of a laser 140 by the head part 130.

FIG. 3 is an illustration for describing adjustment of the laser 140 by the head part 130. The end face lens 132 emits a light supplied from an optical fiber 122. The control unit 102 may adjust a focus by moving the focus adjustment lens 134 relative to the end face lens 132. The control unit 102 may control a direction of the laser 140 by adjusting an angle of the mirror for direction adjustment 136. In this manner, the head part 130 may perform a total of three-axis control, which are two axes of direction control and one axis for focusing.

Figure 4:
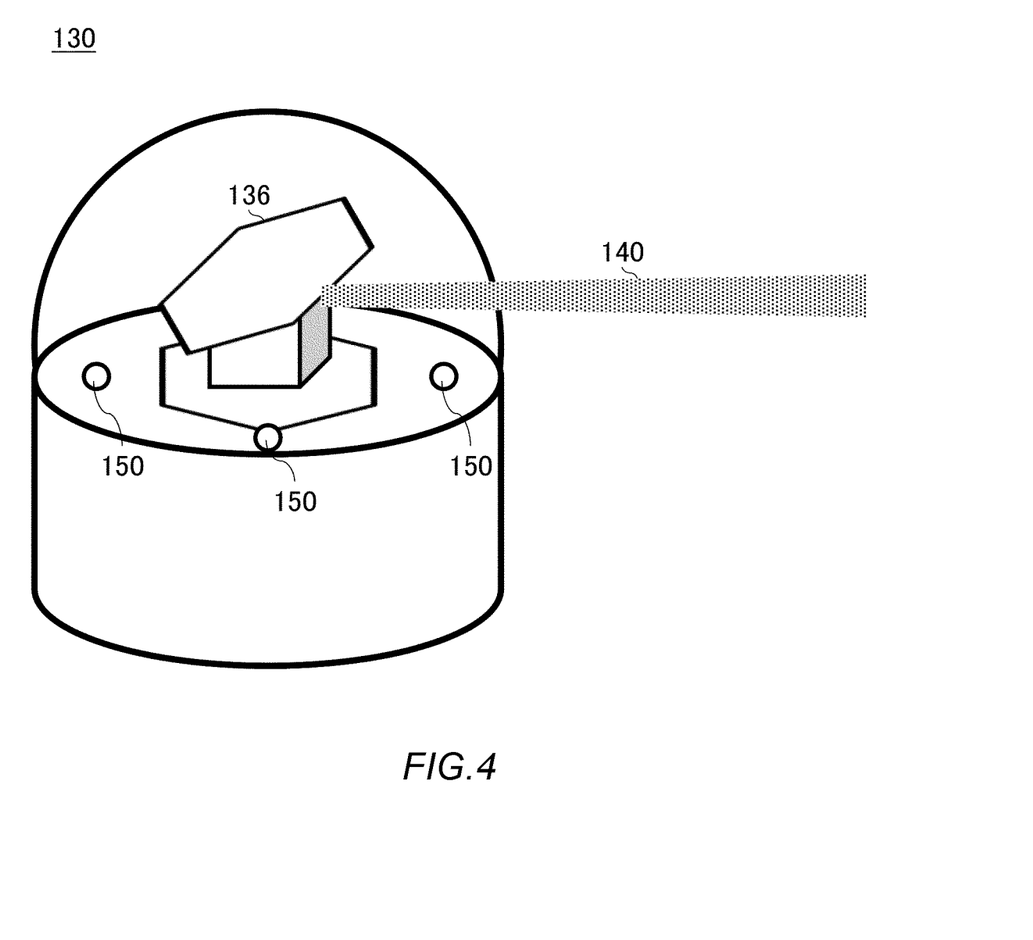
FIG. 4 is a diagram schematically illustrating an example of the head part 130.

FIG. 4 is a diagram schematically illustrating an example of the head part 130. FIG. 4 exemplifies the head part 130 having a dome shape. The control unit 102 adjusts the direction of the laser 140 emitted from the end face lens 132 and the focus adjustment lens 134 by the mirror for direction adjustment 136, and irradiates the laser 140 to a communication partner.

The head part 130 may have an optical sensor 150 for measuring an intensity of a light from the outside. The optical sensor 150 may be an example of the measuring optical sensor. Although FIG. 4 exemplifies a case in which the head part 130 has three optical sensors 150, the number of the optical sensor 150 is not limited thereto. The number of the optical sensor 150 may be other numbers, but is desirably plural.

The control unit 102 may, based on an intensity of a light from an optical communication device of a communication partner measured with the optical sensor 150, perform adjustment of an irradiation direction of the light by communicating with the optical communication device of the communication partner. For example, the control unit 102 may acquire a two-dimensional intensity information of the light (a peak position of the beam) from the communication partner based on a measurement result by a plurality of the optical sensors 150. The control unit 102 may perform the adjustment of the irradiation direction of the light by, for example, informing the optical communication device of the communication partner of a peak position of a light intensity of a receiving beam, and causing the optical communication device of the communication partner to correct the peak position so as to approach the position of the mirror for direction adjustment 136. The optical communication device 100 and the optical communication device of the communication partner may mutually perform adjustment of the irradiation direction of the light by informing each other. In this manner, the optical communication device 100 performs a beam direction correction in an ultra-short cycle. The control unit 102 may also adjust the mirror for direction adjustment 136 based on the intensity of the light from the optical communication device of the communication partner measured with the optical sensor 150.

The optical communication device 100 may be mounted on a mobile object. The optical communication device 100 is mounted on, for example, a flying object. The optical communication device 100 may be mounted on a flying object having an antenna for providing a wireless communication service to a user terminal within a communication area that is formed by irradiating a beam to the ground.

Figure 5:
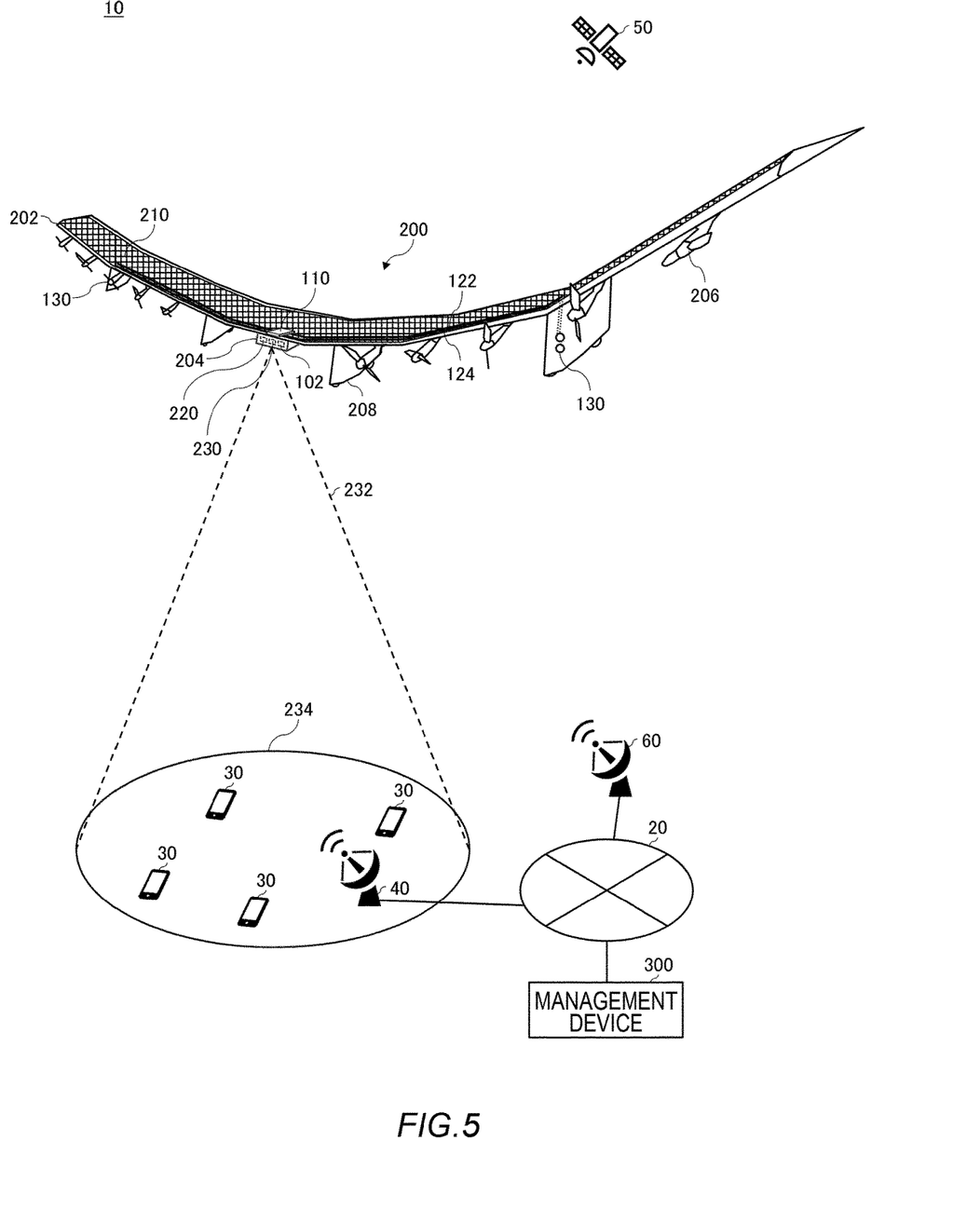
FIG. 5 is a diagram schematically illustrating an example of a HAPS 200.

FIG. 5 is a diagram schematically illustrating an example of a HAPS 200. The HAPS 200 may be an example of a flying object having an antenna for providing a wireless communication service to a user terminal 30 within a communication area 234 that is formed by irradiating a laser 232 to the ground.

The HAPS 200 includes a fuselage 202, a central part 204, a propeller 206, a pod 208, and a solar panel 210. A control unit 220, a control unit 230, and the control unit 102 are arranged in the central part 204.

An electrical power generated by the solar panel 210 is stored in one or more batteries arranged in at least any of the fuselage 202, the central part 204, and the pod 208. The electrical power stored in the battery is utilized by each configuration included in the HAPS 200.

The control unit 220 controls a flight of the HAPS 200. The control unit 220 controls the flight of the HAPS 200 by, for example, controlling a rotation of the propeller 206. In addition, the control unit 220 may also control the flight of the HAPS 200 by changing an angle of a flap or an elevator, which are not illustrated. The control unit 220 may include various types of sensors such as a positioning sensor such as a Global Positioning System (GPS) sensor, a gyro sensor, and an acceleration sensor, and manage the position, moving direction, and moving speed of the HAPS 200.

The control unit 230 controls communication of the HAPS 200 with the ground. The control unit 220 forms the communication area 234 on the ground by using a Service Link (SL) antenna. The control unit 230 forms a service link with the user terminal 30 on the ground by using the SL antenna. The SL antenna may also be a multi-beam antenna. The cell communication area 234 may also be multi-cell.

The control unit 230 may form a feeder link with a gateway 40 on the ground by using a Feeder Link (FL) antenna. The control unit 230 may access a network 20 via the gateway 40.

The control unit 230 may communicate with a communication satellite 50 by using a satellite communication antenna.

The control unit 230 may access the network 20 via the communication satellite 50 and a satellite communication station 60.

The user terminal 30 may be any communication terminal as long as it can communicate with the HAPS 200. For example, the user terminal 30 is a mobile phone such as a smartphone. The user terminal 30 may also be a tablet terminal, a Personal Computer (PC), and the like. The user terminal 30 may also be a so-called Internet of Thing (IoT) device. The user terminal 30 can include all things corresponding to a so-called Internet of Everything (IoE).

The HAPS 200 relays communication between the network 20 and the user terminal 30 via, for example, the feeder link or the communication satellite 50 and the service link. The HAPS 200 may provide the user terminal 30 with a wireless communication service by relaying the communication between the user terminal 30 and the network 20.

The network 20 includes a mobile object communication network. The mobile object communication network may comply with any of 3rd Generation (3G) communication scheme, Long Term Evolution (LTE) communication scheme, 5th Generation (5G) communication scheme, and a communication scheme after 6th Generation (6G) communication scheme. The network 20 may include the Internet.

For example, the HAPS 200 transmits data received from the user terminal 30 within the communication area 234 to the network 20. In addition, for example, when receiving data for the user terminal 30 within the communication area 234 via the network 20, the HAPS 200 transmits the data to the user terminal 30.

A management device 300 manages a plurality of the HAPSs 200. The management device 300 may communicate with the HAPS 200 via the network 20 and the gateway 40. The management device 300 may also communicate with the HAPS 200 via the network 20, the satellite communication station 60, and the communication satellite 50.

The management device 300 controls the HAPS 200 by transmitting an instruction. In order to cover a target area on the ground with the communication area 234, the management device 300 may cause the HAPS 200 to swirl in the upper air of the target area. For example, the HAPS 200 maintains the feeder link with the gateway 40 by adjusting an orientation direction of the FL antenna, and maintains the coverage of the target area with the communication area 234 by adjusting an orientation direction of the SL antenna, while flying in the upper air of the target area in a circular orbit.

In the example illustrated in FIG. 5, the backbone part 110 is arranged near the center of the optical communication device 100, and is connected to the head part 130 arranged in the pod 208 with the optical fiber 122 and a metal cable 124. A case in which four head parts 130 are arranged in the HAPS 200 is described herein as an example.

The control unit 102 retains three-dimensional structural information of the HAPS 200. The three-dimensional structural information includes information such as a structure of the fuselage 202 of the HAPS 200, and an installation position of the head part 130 in the fuselage 202. The control unit 102 may acquire spatial coordinates and an attitude angle of the HAPS 200 from the control unit 220, the control unit 230, and the like, and may constantly updates and maintains them.

The control unit 102 may transmit its receiving sensor coordinates and receiving power information by giving these to a header part of a transmission frame to be transmitted by optical communication. At the time of receiving information by optical communication, the control unit 102 may read the receiving sensor coordinates and the receiving power information of the communication partner that are included in a header of a reception frame. Furthermore, the control unit 102 may perform control of the mirror for direction adjustment 136 such that a laser for communication reaches coordinates calculated from the information on the spatial coordinates, the attitude angle, and the like of the HAPS 200, and the receiving sensor coordinates and the receiving power information of the communication partner.

Figure 6:
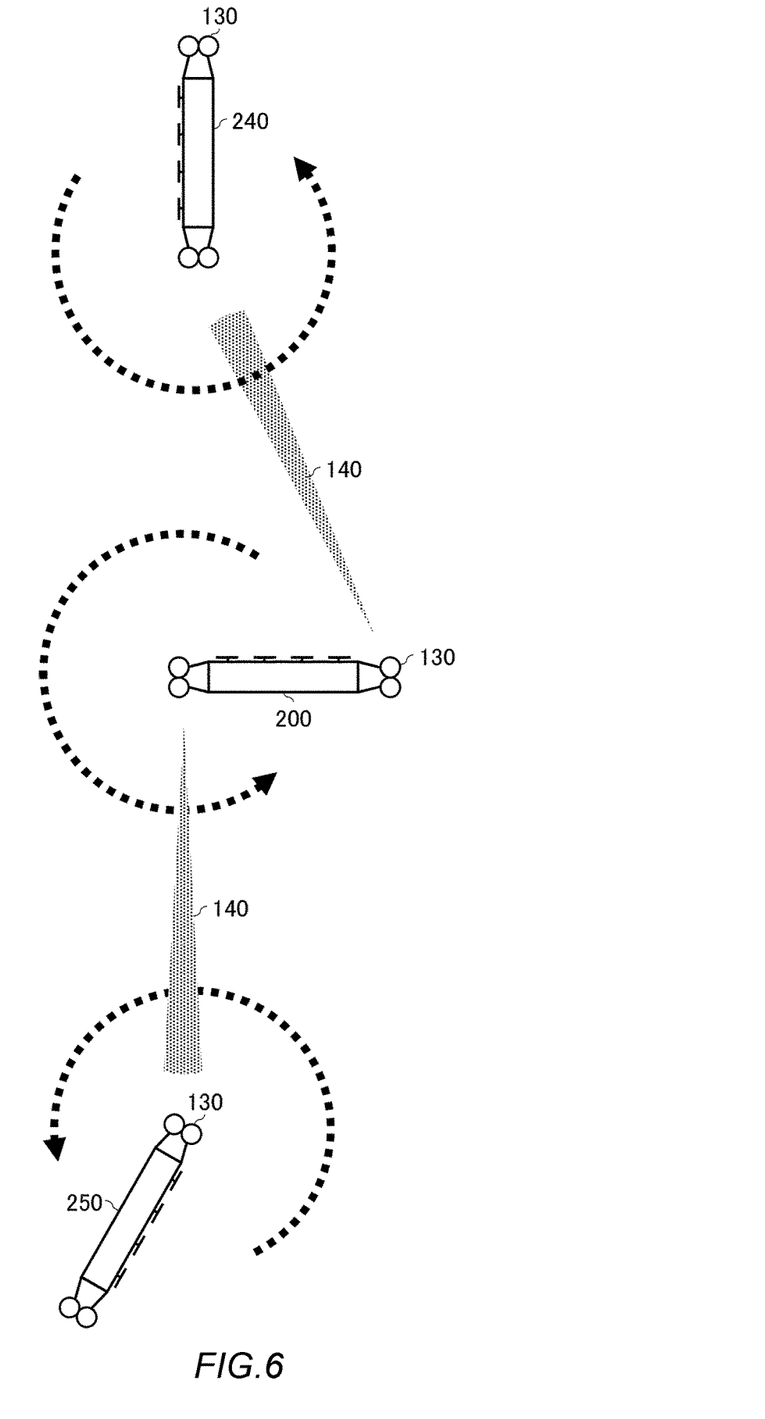
FIG. 6 illustrates an example of an optical communication state between the HAPS 200 and other HAPSs 200.
Figure 7:
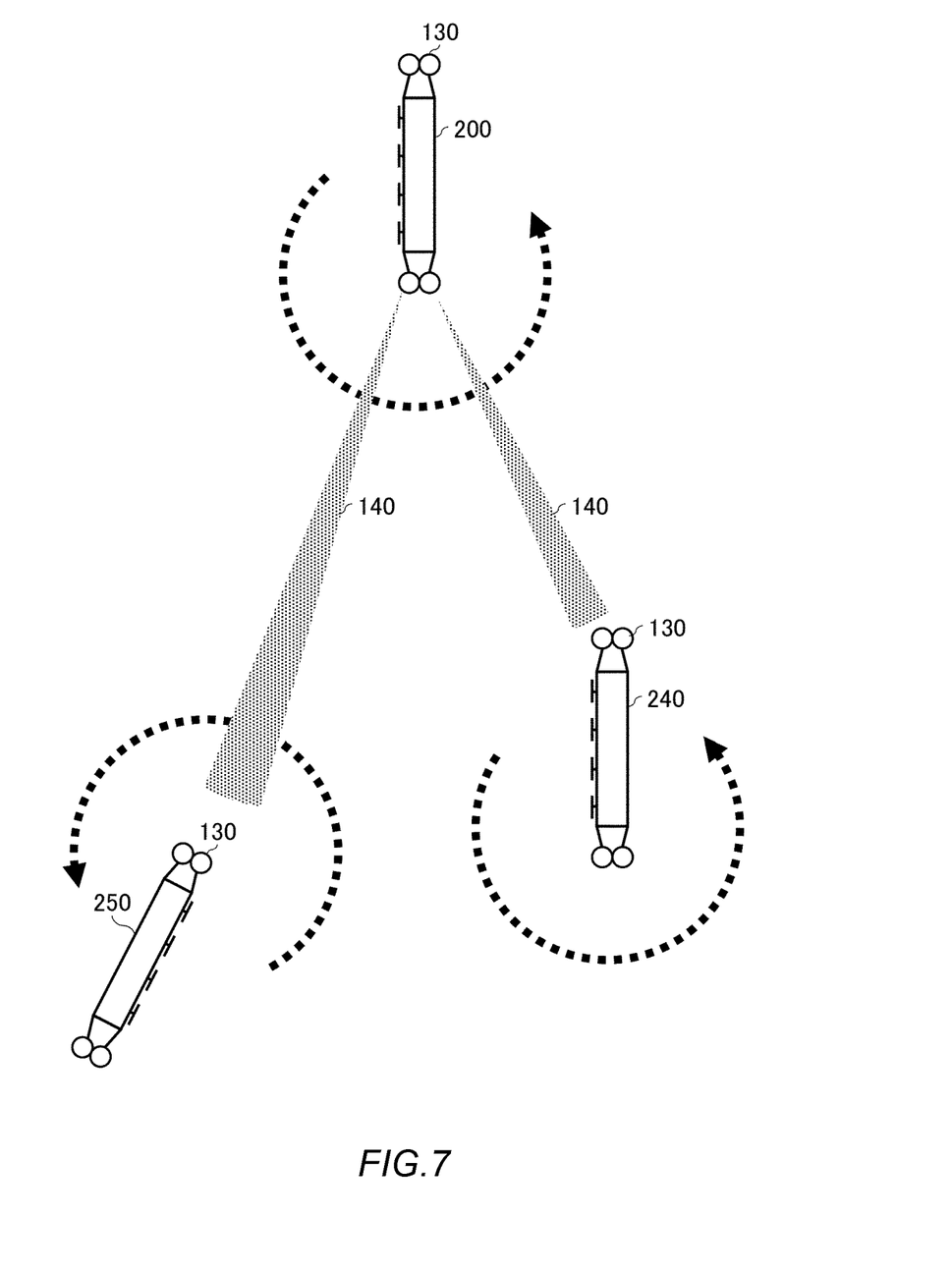
FIG. 7 illustrates an example of the optical communication state between the HAPS 200 and the other HAPSs 200.

FIG. 6 and FIG. 7 illustrate an example of an optical communication state between the HAPS 200 and other HAPSs 200. A HAPS 240 and a HAPS 250 are exemplified as the other HAPSs 200 herein. The HAPS 200 can maintain two links in any arrangement by having two head parts 130 in each of right and left.

For example, in an arrangement as exemplified in FIG. 6, the link with the HAPS 240 and the link with the HAPS 250 can be maintained even if the HAPS 200 has one head part 130 in each of right and left. However, in an arrangement as exemplified in FIG. 7, the fuselage of the HAPS 200 becomes a dead angle, and thus a link can be maintained with only either of the HAPS 240 and the HAPS 250 in the case of having one head part 130 in each of right and left.

In contrast, the HAPS 200 having two head parts 130 in each of right and left can maintain the link with the HAPS 240 and the link with the HAPS 250 even in the arrangement as exemplified in FIG. 7. The number of the head part 130 to be required depends on a fuselage structure and the like of the HAPS 200. With the optical communication device 100 according to the present embodiment, even if the number of the head part 130 required becomes large, it is possible to deal with this by adding only the head part 130, and thus it can contribute to reduction of the weight and the cost of the HAPS 200.

Figure 8:
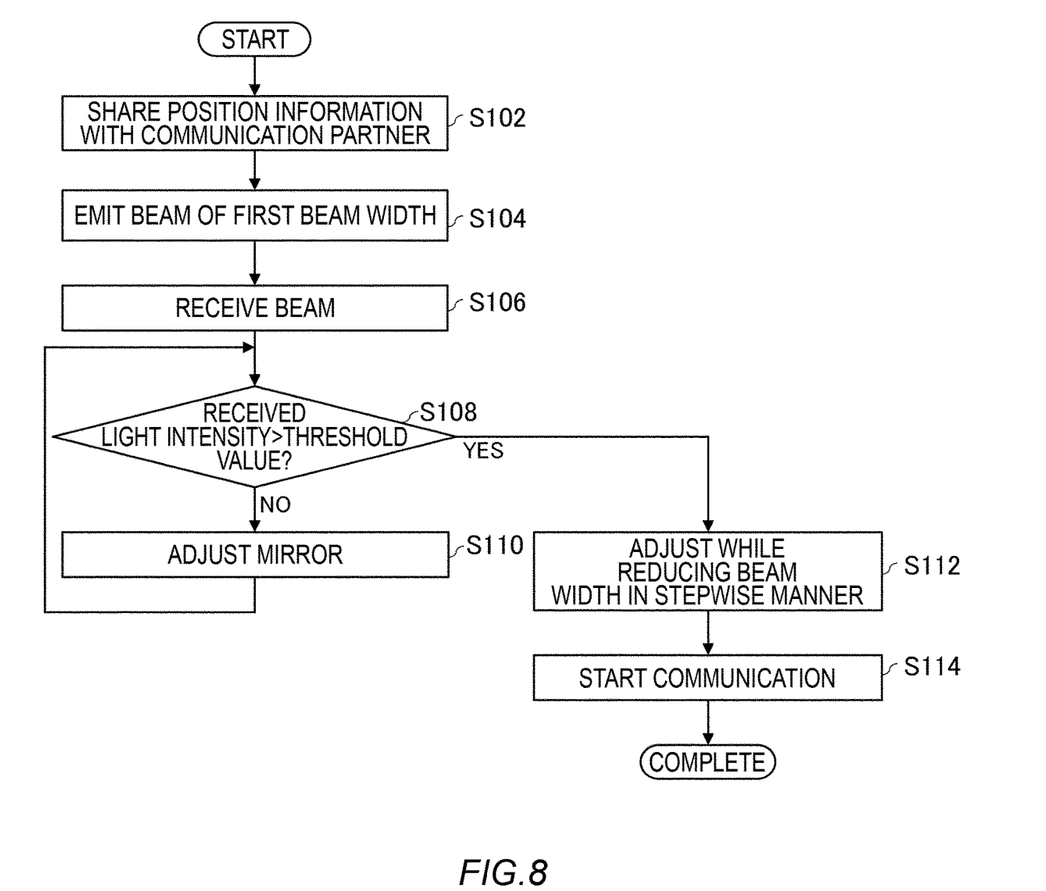
FIG. 8 is a diagram schematically illustrating an example of a flow of processing by the optical communication device 100.

FIG. 8 is a diagram schematically illustrating an example of a flow of processing by the optical communication device 100. A flow of processing until the start of communication between the HAPS 200, and the HAPS 200 of a communication partner, will be described herein.

In particular, optical communication between flying objects such as HAPSs requires beam tracking of an extremely high accuracy because the flying objects are always moving. Since there are no beam intensity information and the like from a communication partner before linking up with the communication partner, it is difficult to target a reception unit of the communication partner. Spatial positioning of a high accuracy is difficult for an object in the air, and there are no coordinates/attitude acquisition methods other than the Global Positioning System (GPS)/Inertial Measurement Unit (IMU). The HAPS 200 according to the present embodiment may perform processing until the start of communication as follows.

In step (step may be abbreviated and described as S) 102, the control unit 102 shares position information with a communication partner. The control unit 102 acquires position information of the HAPS 200 from the control unit 220, and for example, transmits its own device information including the position information to the communication partner via the communication satellite 50, while also receiving communication partner information including position information of the communication partner from the communication partner via the communication satellite 50.

The control unit 102 may transmit its own device information to the management device 300 via the communication satellite 50, and may receive the communication partner information from the management device 300 via the communication satellite 50. If communication with the communication partner using electric waves can be performed, the control unit 102 may communicate its own device information and the communication partner information through communication with the electric waves.

In S104, the control unit 102 controls the backbone part 110 and the head part 130, and irradiates a beam of a first beam width to a position specified by the position information of the communication partner. The first beam width may be, for example, a width greater than a GPS positioning error. In S106, a beam irradiated by the communication partner is received.

In S108, the control unit 102 determines whether a received-light intensity of the beam from the communication partner measured with the optical sensor 150 is stronger than a predetermined threshold value. If it is determined to be weaker than the threshold value, the processing proceeds to S110 to adjust the mirror for direction adjustment 136, and returns to S108. If it is determined to be stronger than the threshold value, the processing proceeds to S112.

In S112, the control unit 102 controls the head part 130 such that the beam width is changed from the first width to a second width narrower than the first width. The control unit 102 refers to the received-light intensity measured with the optical sensor 150, and performs adjustment while reducing the beam width in a stepwise manner. The control unit 102 may change the beam width to the second width by adjusting the beam width and the orientation of the mirror for direction adjustment 136 so that the received-light intensity is maximized. In S114, optical communication with the communication partner starts after the completion of the adjustment.

Although the above-described embodiment described the example in which the optical communication device 100 can perform transmission and reception by optical communication, the embodiment is not limited thereto. The optical communication device 100 may be able to, among transmission and reception by optical communication, perform only transmission or perform only reception. In the case of the former, the optical communication device 100 may include the optical output unit 112, the optical switch 120 connected to the optical output unit 112, the plurality of head parts 130 connected to the optical switch 120, and the control unit 102 for performing control so as to transmit information by emitting a laser from each of the plurality of head parts 130 by switching and guiding a light output by the optical output unit 112 to the plurality of head parts 130 with the optical switch 120. In the case of the latter, the optical communication device 100 may include the optical sensor 114, the optical switch 120 connected the optical sensor 114, the plurality of head parts 130 connected to the optical switch 120, and the control unit 102 for performing control so as to receive information by switching a light received by the plurality of head parts 130 with the optical switch 120 and guiding the light to the optical sensor 114.

Figure 9:
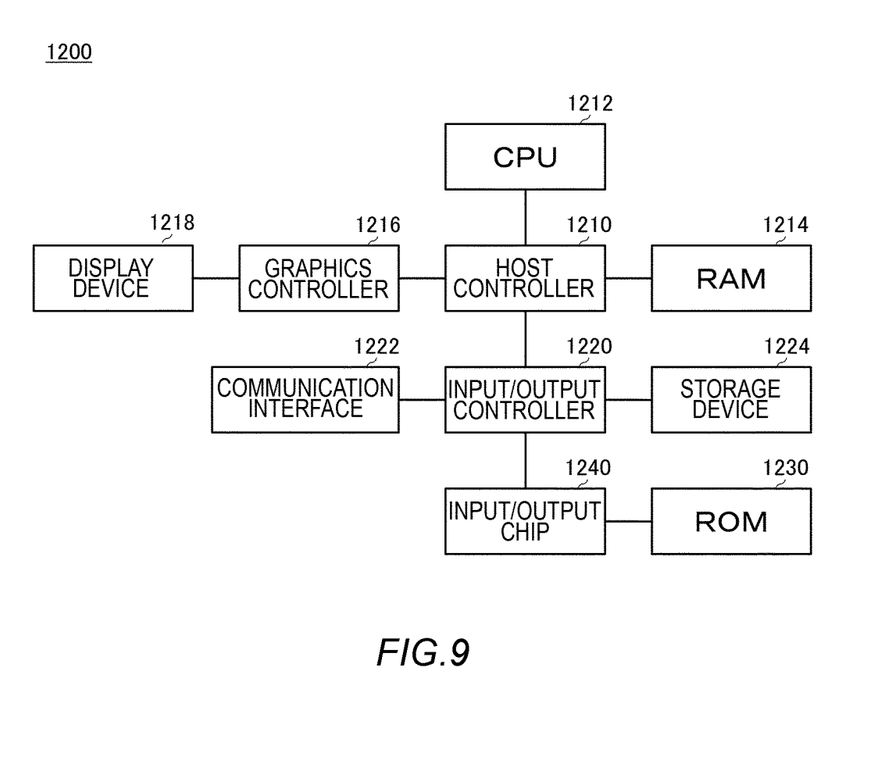
FIG. 9 is a diagram schematically illustrating an example of a hardware configuration of a computer 1200 functioning as an optical communication device 200.

FIG. 9 is a diagram schematically illustrating an example of a hardware configuration of a computer 1200 functioning as the optical communication device 100. Programs installed in the computer 1200 can cause the computer 1200 to function as one or more "units" of the device according to the above-described embodiment or can cause the computer 1200 to execute operations associated with the devices according to the above-described embodiment or the one or more "units", and/or can cause the computer 1200 to execute a process according to the above-described embodiment or steps of the process. Such a program may be executed by a CPU 1212 to cause the computer 1200 to perform specific operations associated with some or all of the blocks in the flow charts and block diagrams described in the specification.

The computer 1200 according to the present embodiment includes the CPU 1212, a RAM 1214, and a graphics controller 1216, which are connected to each other via a host controller 1210. Also, the computer 1200 includes input/output units such as a communication interface 1222, a storage device 1224, a DVD drive and an IC card drive, which are connected to the host controller 1210 via an input/output controller 1220. The storage device 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated, by the CPU 1212, in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The IC card drive reads the program and data from the IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port or the like to the input/output controller 1220.

A program is provided by a computer-readable storage medium such as the DVD-ROM or the IC card. The program is read from the computer-readable storage medium, installed into the storage device 1224, RAM 1214, or ROM 1230, which are also examples of a computer-readable storage medium, and executed by the CPU 1212. Information processing written in these programs is read by the computer 1200, and provides cooperation between the programs and the various types of hardware resources described above. A device or method may be constituted by realizing the operation or processing of information in accordance with the usage of the computer 1200.

For example, in a case where communication is performed between the computer 1200 and an external device, the CPU 1212 may execute a communication program loaded in the RAM 1214 and instruct the communication interface 1222 to perform communication processing based on a processing written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Then, the CPU 1212 may write the processed data back in the external recording medium.

Various types of programs, data, tables, and various types of information such as a database may be stored in a recording medium to receive information processing. The CPU 1212 may execute, on the data read from the RAM 1214, various types of processings including various types of operations, information processing, conditional judgement, conditional branching, unconditional branching, information retrieval/replacement, or the like described throughout the present disclosure and specified by instruction sequences of the programs, and writes the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying the predetermined condition.

The programs or software module described above may be stored on the computer 1200 or in a computer-readable storage medium near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flow charts and block diagrams in the present embodiments may represent steps of processes in which operations are performed or "units" of devices responsible for performing operations. A specific step and "unit" may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuit may include, for example, a reconfigurable hardware circuit including logical AND, logical OR, logical XOR, logical NAND, logical NOR, and other logical operations, and a flip-flop, a register, and a memory element, such as a field programmable gate array (FPGA) and a programmable logic array (PLA).

The computer-readable storage medium may include any tangible device capable of storing an instruction performed by an appropriate device, so that the computer-readable storage medium having the instruction stored thereon constitutes a product including an instruction that may be performed in order to provide means to perform an operation specified by a flowchart or a block diagram. Examples of the computer-readable storage medium may include an electronic storage medium, a magnetic storage medium, an optical storage medium, an electromagnetic storage medium, a semiconductor storage medium, or the like. More specific examples of computer-readable storage media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY(registered trademark) disc, a memory stick, an integrated circuit card, etc.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special purpose computer, or a processor or a programmable circuit of another programmable data processing device locally or via a local area network (LAN), a wide area network (WAN) such as the Internet or the like in order that the general-purpose computer, the special purpose computer, or the processor or the programmable circuit of another programmable data processing device is to perform the computer-readable instruction to provide means to perform operations specified by the flowchart or the block diagram. Examples of the processor include a computer processor, a processing unit, a microprocessor, a digital signal processor, a controller, a microcontroller, and the like.

While the embodiments of the present invention have been described, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by a device, system, program, and method shown in the claims, embodiments, or diagrams can be performed in any order as long as the order is not explicitly indicated by "prior to," "before," or the like and as long as the output from a previous process is not used in a later process. Even if the operation flow is described using phrases such as "first" or "then" as a matter of convenience in the claims, embodiments, or diagrams, it does not necessarily mean that the process must be performed in this order.

EXPLANATION OF REFERENCES

20: network, 30: user terminal, 40: gateway, 50: communication satellite, 60: satellite communication station, 100: optical communication device, 102: control unit, 110: backbone part, 112: optical output unit, 114: optical sensor, 116: Ether converter, 118: optical splitter, 120: optical switch, 122: optical fiber, 124: metal cable, 130: head part, 132: end face lens, 134: focus adjustment lens, 136: mirror for direction adjustment, 140: laser, 150: optical sensor, 200: HAPS, 202: fuselage, 204: central part, 206: propeller, 208: pod, 210: solar panel, 220: control unit, 230: control unit, 232: laser, 234: communication area, 240: HAPS, 250: HAPS, 300: management device, 1200: computer, 1210: host controller, 1212: CPU, 1214: RAM, 1216: graphics controller, 1218: display device, 1220: input/output controller, 1222: communication interface, 1224: storage device, 1230: ROM, 1240: input/output chip.

What is claimed is:

1. An optical communication device comprising:
a transmitting optical output unit for transmitting information by optical communication;
a receiving optical sensor for receiving information by optical communication;
an optical switch that is connected to the transmitting optical output unit and the receiving optical sensor via an optical splitter;
a plurality of head parts that are connected to the optical switch; and
a control unit for performing control so as to transmit information by emitting a laser from each of the plurality of head parts by switching and guiding a light output by the transmitting optical output unit to the plurality of head parts with the optical switch, and receive information by switching a light received by the plurality of head parts with the optical switch and guiding the light to the receiving optical sensor, wherein each of the plurality of head parts has a lens part comprising an end face lens that is arranged at one end of an optical fiber in which the other end is connected to the optical switch, and a focusing lens for adjusting a focus.

2. The optical communication device according to claim 1, wherein
each of the plurality of head parts has a mirror for direction adjustment that is arranged with respect to the lens part, for adjusting a direction of a light emitted from the lens part and adjusting a direction of a light from the outside with respect to the lens part.

3. An optical communication device comprising:
a transmitting optical output unit for transmitting information by optical communication;
a receiving optical sensor for receiving information by optical communication;
an optical switch that is connected to the transmitting optical output unit and the receiving optical sensor via an optical splitter;
a plurality of head parts that are connected to the optical switch; and
a control unit for performing control so as to transmit information by emitting a laser from each of the plurality of head parts by switching and guiding a light output by the transmitting optical output unit to the plurality of head parts with the optical switch, and receive information by switching a light received by the plurality of head parts with the optical switch and guiding the light to the receiving optical sensor, wherein
each of the plurality of head parts has a measuring optical sensor for measuring an intensity of a light from the outside.

4. The optical communication device according to claim 1, wherein
each of the plurality of head parts has a measuring optical sensor for measuring an intensity of a light from the outside.

5. The optical communication device according to claim 2, wherein
each of the plurality of head parts has a measuring optical sensor for measuring an intensity of a light from the outside.

6. The optical communication device according to claim 3, wherein
the control unit is configured to perform adjustment of an irradiation direction of a light from an optical communication device of a communication partner measured with the measuring optical sensor based on an intensity of the light from the optical communication device of the communication partner, by communicating with the optical communication device of the communication partner.

7. The optical communication device according to claim 1, wherein:
each of the plurality of head parts has a mirror for direction adjustment that is arranged with respect to the lens part, for adjusting a direction of a light emitted from the lens part and adjusting a direction of a light from the outside with respect to the lens part, and a measuring optical sensor for measuring an intensity of the light from the outside; and
the control unit is for adjusting the mirror for direction adjustment based on an intensity of a light from an optical communication device of a communication partner measured with the measuring optical sensor.

8. The optical communication device according to claim 1, wherein
the optical communication device is mounted on a mobile object.

9. The optical communication device according to claim 2, wherein
the optical communication device is mounted on a mobile object.

10. The optical communication device according to claim 8, wherein
the optical communication device is mounted on a flying object.

11. The optical communication device according to claim 10, wherein
the optical communication device is mounted on the flying object having an antenna for providing a wireless communication service to a user terminal within a communication area that is formed by irradiating a beam to the ground.

12. The optical communication device according to claim 10, wherein
the control unit is for acquiring communication partner information including position information of a flying object of a communication partner, and controlling the head parts such that a beam of a first width is emitted from at least any head part of the plurality of head parts to a position represented by the position information, and in response to receiving information from the flying object of the communication partner by receiving a light from the flying object of the communication partner, a beam width of the head part is changed from the first width to a second width narrower than the first width.

13. The optical communication device according to claim 11, wherein
the control unit is for acquiring communication partner information including position information of a flying object of a communication partner, and controlling the head parts such that a beam of a first width is emitted from at least any head part of the plurality of head parts to a position represented by the position information, and in response to receiving information from the flying object of the communication partner by receiving a light from the flying object of the communication partner, a beam width of the head part is changed from the first width to a second width narrower than the first width.

14. A system comprising:
the optical communication device according to claim 8; and
the mobile object on which the optical communication device is mounted.

15. A non-transitory, computer-readable storage medium having stored thereon a program that causes an optical communication device comprising a transmitting optical output unit for transmitting information by optical communication, a receiving optical sensor for receiving information by optical communication, an optical switch that is connected to the transmitting optical output unit and the receiving optical sensor via an optical splitter, and a plurality of head parts that are connected to the optical switch, to perform:
    transmitting information by emitting a laser from each of the plurality of head parts by switching and guiding a light output by the transmitting optical output unit to the plurality of head parts with the optical switch; and
    receiving information by switching a light received by the plurality of head parts with the optical switch and guiding the light to the receiving optical sensor, wherein each of the plurality of head parts has a lens part comprising an end face lens that is arranged at one end of an optical fiber in which the other end is connected to the optical switch, and a focusing lens for adjusting a focus.

16. An optical communication method to be performed by an optical communication device, wherein the optical communication device has a transmitting optical output unit for transmitting information by optical communication, a receiving optical sensor for receiving information by optical communication, an optical switch that is connected to the transmitting optical output unit and the receiving optical sensor via an optical splitter, and a plurality of lens parts that are connected to the optical switch, wherein each of the plurality of lens parts comprises an end face lens that is arranged at one end of an optical fiber in which the other end is connected to the optical switch, and a focusing lens for adjusting a focus,
the optical communication method comprising:
transmitting information by emitting a laser from each of the plurality of lens parts by switching and guiding a light output by the transmitting optical output unit to the plurality of lens parts with the optical switch; and
receiving information by switching a light received by the plurality of lens parts with the optical switch and guiding the light to the receiving optical sensor.

17. An optical communication device comprising:
an optical output unit;
an optical switch that is connected to the optical output unit;
a plurality of head parts that are connected to the optical switch; and
a control unit for performing control so as to transmit information by emitting a laser from each of the plurality of head parts by switching and guiding a light output by the optical output unit to the plurality of head parts with the optical switch, wherein each of the plurality of head parts has a lens part comprising an end face lens that is arranged at one end of an optical fiber in which the other end is connected to the optical switch, and a focusing lens for adjusting a focus.

18. An optical communication device comprising:
an optical sensor;
an optical switch that is connected to the optical sensor;
a plurality of head parts that are connected to the optical switch; and
a control unit for performing control so as to receive information by switching a light received by the plurality of head parts with the optical switch and guiding the light to the optical sensor, wherein each of the plurality of head parts has a lens part comprising an end face lens that is arranged at one end of an optical fiber in which the other end is connected to the optical switch, and a focusing lens for adjusting a focus.

* * * * *